Figure 1:
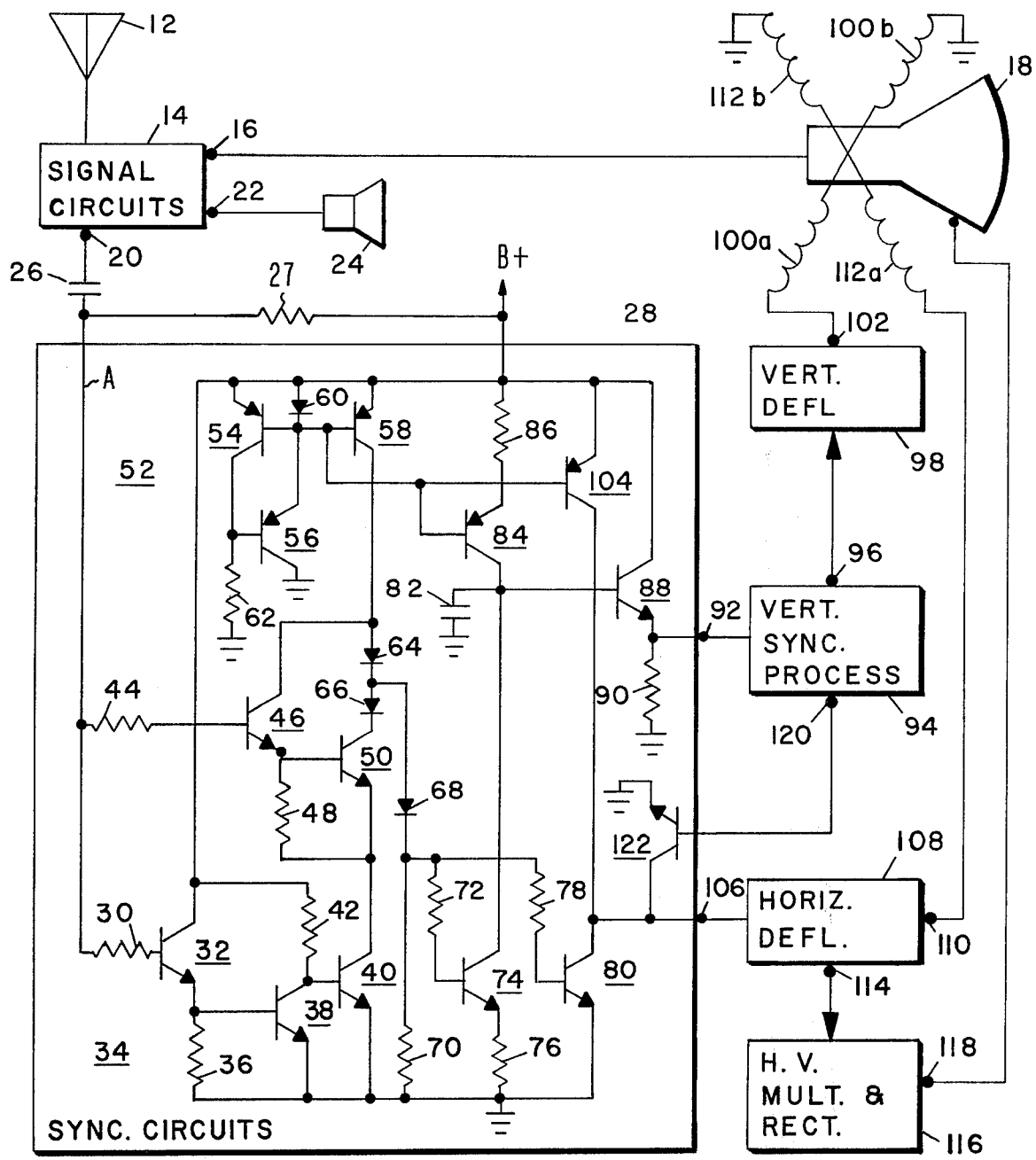

United States Patent [19]

Avery

[11] 4,008,370
[45] Feb. 15, 1977

[54] AUTOMATIC NOISE GATE FOR A SYNCHRONIZING SIGNAL AMPLIFIER

[75] Inventor: Leslie Ronald Avery, Lightwater, England

[73] Assignee: RCA Corporation, New York, N.Y.

[22] Filed: Jan. 19, 1976

[21] Appl. No.: 649,973

[30] Foreign Application Priority Data

Sept. 15, 1975 United Kingdom ............ 37881/75

[52] U.S. Cl. ...................... 358/155; 178/DIG. 12
[51] Int. Cl.$^2$ ........................................ H04N 5/08
[58] Field of Search .......... 178/7.3 R, 7.3 S, 7.5 R, 178/7.5 S, DIG. 12

[56] References Cited
UNITED STATES PATENTS

| | | | |
|---|---|---|---|
| 3,441,669 | 4/1969 | Janson et al. ............ | 178/DIG. 12 |
| 3,639,780 | 2/1972 | Lovelace .................... | 178/DIG. 12 |

Primary Examiner—Robert L. Richardson
Attorney, Agent, or Firm—Eugene M. Whitacre; Paul J. Rasmussen

[57] ABSTRACT

A synchronizing signal amplifier which has an input terminal coupled to a source of synchronizing signals and noise signals by means of a capacitor has its common terminal coupled to reference potential by means of a switching circuit having its input terminal coupled to the source of synchronizing signals and noise signals. When signals produced by the source of synchronizing signals and noise signals are less than a noise threshold level established by the switching means, the common terminal of the amplifier is coupled to reference potential by the switching means and the current through the capacitor is basically a function of the input impedance of the amplifier.

When noise pulses produced by the source of synchronizing signals and noise signals are greater than the noise threshold level, the common terminal of the amplifier is decoupled from reference potential by the switching means and the current through the capacitor is a function of the input impedance of the switching means which is much greater than the input impedance of the amplifier. The change of charging impedance reduces the change of charge on the capacitor during noise pulses.

5 Claims, 2 Drawing Figures

AUTOMATIC NOISE GATE FOR A SYNCHRONIZING SIGNAL AMPLIFIER

BACKGROUND OF THE INVENTION

This invention relates to an automatic noise gate for a synchronizing signal amplifier.

Impulse noise has long been a problem in television receivers, being particularly upsetting to sweep synchronizing and AGC systems. The noise pulses are generally of much greater amplitude than the synchronizing components of the composite video signal. As a result, an AGC system which is allowed to sample these large amplitude noise pulses will develop an output control voltage which tends to rapidly decrease the gain of the IF amplifier. The result of this AGC control voltage change is an undesirably attenuated composite video signal.

One effect of this rapid attenuation of composite video signal is an intermittent loss of synchronization. When a greatly attenuated composite video signal is applied to a conventional sync separator, the sync separator is unable to immediately respond to the attenuated video signal. The resultant loss of synchronization pulses at the output of the sync separator causes the vertical and horizontal deflection systems to become unlocked.

A well-known method for minimizing the effects of impulse noise on AGC systems is to turn the AGC system off for the duration of the noise pulse. This prevents the AGC system from sampling the large amplitude noise pulses, and, consequently from developing an AGC output voltage which reduces the gain of the IF amplifier.

Turning the AGC system off for the duration of the noise pulse while correcting AGC system problems allows charging of capacitors coupling the composite video signal to sync amplifier and sync separator circuits during the noise pulses to the extent that several sync pulses are dropped following the noise pulse.

SUMMARY OF THE INVENTION

An automatic noise gate of a synchronizing signal amplifier comprises a capacitor having a first terminal adapted to be coupled to a source of synchronizing signals, having a maximum level less than a first level, and noise signals, having a maximum level greater than the first level, and a second terminal. Means providing a first charging path, including an active current conducting device, coupled to the second terminal of the capacitor, charges the capacitor from the source of signals substantially in accordance with the characteristics of the first charging path when the active current conducting device is enabled. Sensing means providing a second charging path coupled to the second terminal of the capacitor and the means providing a first charging path enables the active current conducting device, when signals produced by the source of signals is less than the first level and disables the active current conducting device when signals produced by the source of signals is greater than the first level. Charging of the capacitor from the source of signals substantially in accordance with the characteristics of the second charging path is therefore provided when the signal produced by the source of signals are greater than the first level.

Figure 2:
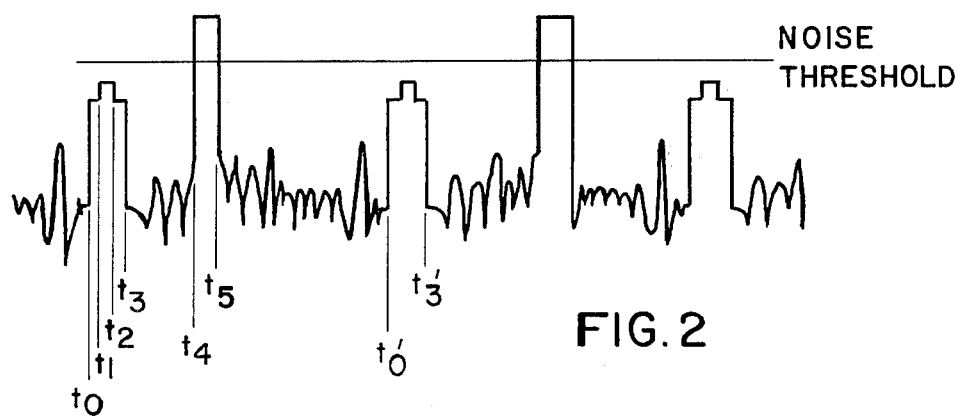

A more detailed description of a preferred embodiment of the invention is given in the following detailed description and accompanying drawings of which:

FIG. 1 is a schematic diagram, partially in block form, of a television receiver embodying the invention; and FIG. 2 illustrates a waveform at a terminal A in the schematic diagram of FIG. 1.

DESCRIPTION OF THE INVENTION

In FIG. 1, an antenna 12 intercepts radio frequency (RF) electromagnetic signals and produces RF electrical signals which are coupled to signal circuits 14. The RF signals coupled to signal circuits 14 are amplified and detected to recover the modulation of the video carrier which is representative of the video signal transmitted. The recovered video signal is provided at an output terminal 16 and is coupled to the control electrode of the kinescope 18 to provide for intensity modulation of the electron beam produced within the kinescope 18. In addition, the video signal including synchronizing information is provided at an output terminal 20 of signal circuits 14.

The detected signal produced by the signal circuits 14 also contains modulation of the audio carrier which is representative of the audio signal transmitted. The recovered audio signal is provided at an output terminal 22 which is coupled to a speaker 24 which transforms the audio signals into acoustic waves.

The video signals including synchronizing signals developed at terminal 20 of signal circuits 14 are coupled through a capacitor 26 to a terminal A of sync circuits 28. In order to describe the operation of the sync circuits 28, the operation will be considered under the following conditions: (1) operation during the sync interval ($t_0$–$t_3$ of FIG. 2); and, (2) operation during a noise pulse interval ($t_4$–$t_5$ of FIG. 2) when the noise pulse has an amplitude greater than the noise threshold shown in FIG. 2.

Prior to $t_0$ it will be assumed that signals produced at terminal A as shown in FIG. 2 did not contain any noise pulses. During a portion ($t_1$–$t_2$) of the synchronizing interval, signals at terminal A produce a current through a series combination of a resistor 30, the base-emitter junction of a first transistor 32 of a noise gate 34 and a resistor 36 coupled between terminal A and reference potential. The current through the base-emitter junction produces a current from a source of direct current potential (B+) to which the collector electrode of transistor 32 is coupled. By properly choosing the values of resistors 30 and 36, magnitudes of potential at terminal A less than the noise threshold shown in FIG. 2 will produce a voltage across resistor 36 less than the voltage required to forward bias the base-emitter junction of a second transistor 38 of noise gate 34 which junction is coupled in parallel with the resistor 36. Since the base-emitter junction of transistor 38 is not forward biased during the synchronizing interval, the voltage at the collector electrode of transistor 38 will be sufficient to provide for forward biasing of the base-emitter junction of a third transistor 40 of the noise gate 34 by means of a resistor 42 coupled from B+ to the collector electrode of transistor 38 and the base electrode of transistor 40. With the base-emitter junction of transistor 40 forward biased in a manner provided for by the resistor 42, maximum conduction between the collector and emitter electrodes of transistor 40 is provided for.

Due to the forward biasing of the base-emitter junction of transistor 40, the voltage produced at terminal A during the interval $t_1$–$t_2$ produces current flow through the series combination of a resistor 44, the base-emitter junction of transistor 46, the parallel combination of a resistor 48 and the base-emitter junction of a transistor 50 and the collector-emitter junction of transistor 40 to reference potential. Current flow through the base-emitter junctions of transistors 46 and 50 provides for current flow through the collector-emitter junction of transistor 46 from the current source 52 comprising transistors 54, 56 and 58, diode 60 and resistor 62. Forward biasing of the base-emitter junction of transistor 50 provides for current flow through diodes 64 and 66 coupled in series combination between the current source 52 and the collector electrode of transistor 50.

With current flowing through diodes 64 and 66, the potential at the junction of the diodes 64 and 66 is below the level which is required to forward bias a diode 68 in series combination with a resistor 70, which series combination is coupled between the junction of diodes 64 and 66 and reference potential. Under this condition, the voltage developed at the junction of diode 68 and the resistor 70 is approximately zero volts; therefore, no current flows through the series combination of a resistor 72, the base-emitter junction of a transistor 74, and a resistor 76 coupled in parallel with resistor 70, or through a resistor 78 and the base-emitter junction of a transistor 80 also coupled in parallel with resistor 70.

With no current flow through the base-emitter junction of transistor 74, transistor 74 is cut off and a capacitor 82 coupled to the collector electrode of transistor 74 begins to charge from the constant current source provided for by transistor 84 in combination with a resistor 86 operating in conjunction with the constant current source 52. As the charge on the capacitor 82 increases, the base-emitter junction of a transistor 88 having its collector electrode coupled to B+ and its emitter electrode coupled to reference potential by means of a resistor 90 is forward biased and a voltage is developed across the resistor 90 which corresponds to the voltage across the capacitor 82. The emitter electrode of transistor 88 is also coupled to an output terminal 92 which is coupled to a vertical sync processor 94 which provides for a synchronizing pulse at an output terminal 96 at a predetermined voltage level at output terminal 92 of sync circuits 28, which level is only attained once each field of the video signal.

The synchronizing pulses at terminal 96 are coupled to a vertical deflection circuit 98 which develops a current signal, which is properly phased with the signal at terminal A, through vertical deflection windings 100a and 100b which are coupled between an output terminal 102 of vertical deflection circuit 98 and reference potential.

Current flow through the vertical deflection windings 100a and 100b provide for the development of a flux in close proximity with the kinescope 18 which provides for a vertical deflection of the electron beam on the face of the kinescope tube 18.

With no current flowing through the base-emitter junction of transistor 80, transistor 80 is cut off and the voltage at the collector electrode which is coupled to a constant current source comprising a transistor 104 operating in conjunction with the constant current source 52 provides a potential of approximately B+ at an output terminal 106 which is coupled to a horizontal deflection circuit 108. The transition from a potential of approximately reference potential to B+ at terminal 106 at $t_1$ as shown in FIG. 2 provides for proper synchronization of the signals produced at an output terminal 112 of horizontal deflection circuit 108 and synchronizing signals at terminal A of sync circuits 28. Current produced through horizontal deflection windings 112a and 112b coupled between output terminal 110 and reference potential and placed in close proximity with the kinescope 18 provide for horizontal deflection of the electron beam produced in the kinescope 18.

The horizontal deflection circuit 108 also produces pulses at an output terminal 114 which is coupled to a high voltage multiplier and rectifier 116 thereby developing a high voltage direct current potential at an output terminal 118 which is coupled to the ultor electrode of the kinescope 18. The high voltage potential on the ultor electrode of the kinescope 18 provides for the desired acceleration of the electron beam produced in the electron gun of the kinescope 18.

In order to disable the horizontal synchronizing signal produced at the collector electrode of transistor 80 during vertical synchronizing periods, an output signal developed in an output terminal 120 of vertical sync processor 94 is coupled to the base electrode of a transistor 122. The signal at output terminal 120 provides for saturation of the transistor 122, thereby clamping the voltage at the collector electrode of transistor 80 to approximately reference potential during the vertical synchronizing interval.

During the interval $t_3$–$t_4$ as shown in FIG. 2, the voltage at terminal A is less than that which is required to forward bias the base-emitter junctions of transistors 32 and 46 by way of resistors 30 and 44. With transistor 46 cut off, transistor 50 is also cut off and the potential at the junction of diodes 64 and 66 increases to a level which forward biases the diode 68 and produces a potential at the junction of diode 68 and resistor 70 which provides for forward biasing of the base-emitter junctions of transistors 74 and 80. With the base-emitter junction of transistor 74 forward biased, capacitor 82 coupled to the collector electrode of transistor 74 is discharged and the potential at output terminal 92 of sync circuits 28 decreases to approximately reference potential.

With the base-emitter junction of transistor 80 forward biased, the potential at the output terminal 106 of sync circuits 28 is reduced to approximately reference potential.

Under normal signal conditions, that is, absent noise pulses in excess of the amplitude of the synchronizing signal, only the synchronizing signal provides for current flow through the capacitor 26. Therefore, between synchronizing signals, the capacitor 26 can discharge via resistor 27 in order to provide for acknowledgment of subsequent synchronizing signals.

During the periods when noise pulses are produced which exceed the level of the noise threshold such as shown during the interval $t_4$–$t_5$ of FIG. 2, the capacitor 26 without the noise gate 34 would be charged through resistor 44 and the base-emitter junctions of transistor 46 and 50 to an abnormally high voltage. With capacitor 26 charged to the abnormally high voltage, capacitor 26 would normally not be discharged sufficiently at the beginning of the next synchronizing interval such as at $t_0'$ to provide for forward biasing of the base-emitter junctions of transistors 46 and 50 by the synchronizing signal occurring between $t_0'$ and $t_3'$. Therefore, proper synchronization of the vertical and horizontal deflection circuits would not be maintained.

With the addition of the noise gate 34 which, in conjunction with resistor 30, establishes the noise threshold as shown in FIG. 2, noise pulses produced at terminal A of sync circuits 28 which exceed the noise threshold, develop a voltage across resistor 36 which provides for forward biasing of the base-emitter junction of transistor 38, thereby reducing the voltage at the collector electrode of transistor 38 to a level which provides for cutoff of the transistor 40. With the transistor 40 cut off, the impedance looking into the base-emitter junction of transistor 46 is very high and, therefore, the charging impedance for capacitor 26 is the resistance of resistor 30 plus the input impedance of transistor 32. Since the resistance of resistor 30 is chosen to be much higher than that of the resistance of resistor 44, the charging rate of capacitor 26 is increased by approximately the ratio of resistance of resistor 30 to the resistance of resistor 44. This technique minimizes the change of charge on capacitor 26 during the noise pulse interval.

As can be seen by reference to the above discussion, the ability of the synchronizing circuits to acknowledge synchronizing signals occurring subsequent to noise pulses is greatly enhanced by the use of the noise gate.

What is claimed is:

1. In a synchronizing signal amplifier, an automatic noise gate comprising:
    a capacitor having a first terminal adapted to be coupled to a source of synchronizing signals, having a maximum level less than a first level, and noise signals, having a maximum level greater than said first level, and a second terminal;
    means providing a first charging path, including an active current conducting device, coupled to said second terminal of said capacitor for charging said capacitor from said source of signals substantially in accordance with the characteristics of said first charging path when said active current conducting device is enabled; and
    sensing means providing a second charging path coupled to said second terminal of said capacitor and said means providing a first charging path for enabling said active current conducting device when signals produced by said source of signals is less than said first level and for disabling said active current conducting device when signals produced by said source of signals is greater than said first level, thereby providing for charging of said capacitor from said source of signals substantially in accordance with the characteristics of said second charging path when signals produced by said source of signals are greater than said first level.

2. An automatic noise gate according to claim 1 wherein sensing means includes:
    means coupled to said second terminal of said capacitor for providing said second charging path and for developing second signals proportional to signals produced by said source of signals; and
    threshold means coupled to said means for providing said second charging path and for developing said second signals and coupled to said active current conducting device for enabling said active current conducting device when said second signals are less than a predetermined level corresponding to said first level and disabling said active current conducting device when said second signals are greater than said predetermined level.

3. An automatic noise gate according to claim 2 wherein said threshold means is a second active current conducting device and said predetermined level is the base-emitter voltage at which the collector-base junction is at a predetermined conduction level.

4. An automatic noise gate according to claim 3 wherein said means providing a first charging path includes means coupled to said second terminal of said capacitor for providing said first charging path and for developing third signals proportional to signals produced by said source of signals when said active current conducting device is enabled.

5. In a synchronizing signal amplifier, an automatic noise gate comprising:
    a capacitor having a first terminal adapted to be coupled to a source of synchronizing signals having a maximum level less than a first level and noise signals having a maximum level greater than said first level and a second terminal;
    a source of direct current;
    switching means, having a first input terminal coupled to said second terminal of said capacitor, a first common terminal coupled to reference potential and a first output terminal and having a first impedance between said first input and said first common terminals which is substantially a function of the signal level therebetween, for providing for a maximum conduction between said first output and said first common terminals when the signal level developed between said first input terminal and reference potential is less than said first level; and
    amplifying means, having a second input terminal coupled to said second terminal of said capacitor, a second common terminal coupled to said first output terminal and a second output terminal coupled to said source of direct current and having a second impedance between said second input and said second common terminals which is substantially a function of the conduction between said second output and said second common terminals, for changing the conduction between said second output and said second common terminals in response to the change of signal level at said second input terminal thereby developing an output signal at said second output terminal when the signal level developed between said first input terminal and reference potential is less than said first level, and providing for current through said capacitor which is substantially a function of said first impedance when the signal level developed between said first input terminal and said reference potential is greater than said first level.

* * * * *